United States Patent [19]

Nomura

[11] 4,266,913
[45] May 12, 1981

[54] SWASH-PLATE TYPE COMPRESSOR

[75] Inventor: Hiroshi Nomura, Higashimatsuyama, Japan

[73] Assignee: Diesel Kiki Co., Ltd., Tokyo, Japan

[21] Appl. No.: 31,391

[22] Filed: Apr. 19, 1979

[30] Foreign Application Priority Data

May 22, 1978 [JP] Japan .................. 53/68935[U]

[51] Int. Cl.³ .................................. F04B 1/14
[52] U.S. Cl. ........................... 417/269; 308/236
[58] Field of Search .................. 417/269; 308/236

[56] References Cited

U.S. PATENT DOCUMENTS

| 4,042,309 | 8/1977 | Hiraga | 417/269 |
| 4,046,432 | 9/1977 | Hofmann | 308/236 |

FOREIGN PATENT DOCUMENTS

| 857713 | 10/1952 | Fed. Rep. of Germany | 308/236 |
| 778607 | 7/1957 | United Kingdom | 308/236 |
| 2010986 | 7/1979 | United Kingdom | 308/236 |

Primary Examiner—William L. Freeh
Attorney, Agent, or Firm—Frishauf, Holtz, Goodman and Woodward

[57] ABSTRACT

An improved swash-plate type compressor including a pair of thrust bearings interposed between the swash plate and central seat portions provided on the cylinder blocks forming the outer frame of the compressor, characterized by that a retainer is interposed between the bearing ring of each of said thrust bearings on the cylinder block side and associated one of said central seat portions, wherein the bearing ring has a periphery thereof formed with at least one engaging cut, while the retainer has opposite end faces thereof formed with at least one first engaging protuberance and at least one second engaging protuberance for engagement with said engaging cut and an associated end of corresponding one of spaces axially formed through the cylinder blocks, respectiveiy. Rotation of said bearing ring can thus be prevented with respect to the central seat portion of the cylinder block to avoid abrasion in the opposed faces of the two members.

6 Claims, 5 Drawing Figures

SWASH-PLATE TYPE COMPRESSOR

FIELD OF THE INVENTION

The present invention relates to a swash-plate type compressor for use in an air conditioner for vehicles, and more particularly to improvements in the thrust bearings which are provided in the compressor for supporting thrust loads applied by the swash plate.

In a conventional swash-plate type compressor for use in an air conditioner for vehicles as known, e.g. from U.S. Pat. No. 3,801,227 issued Apr. 2, 1974, a swash plate is secured to the rotary shaft of the compressor, rotation of which causes pistons engaging the outer fringe of the swash plate, to make reciprocating motions for carrying out suction and compression of refrigerant circulating in the refrigerating circuit of the air conditioner. A pair of thrust bearings are interposed between the opposite end faces of the boss portion of the swash plate and the associated faces of seat portions of combined cylinder blocks forming the outer frame of the compressor, to journal the swash plate for rotation relative to the cylinder blocks. The thrust bearing comprises a pair of bearing rings, one of which is held in urging contact with an associated end face of said boss portion of the swash plate and the other with an associated face of the seat portion of the corresponding cylinder block, and a plurality of needle rollers interposed between the bearing rings. Rotation of the swash plate causes corresponding rotation of the bearing rings on the cylinder block side, relative to the cylinder block, due to the rolling resistance of the needle rollers of the thrust bearing. Consequently, said associated face of the seat portion of said cylinder block undergoes abrasion due to its sliding contact with the swash plate, so that there occurs an increase in the thrust or axial clearance between the seat portion of the cylinder block and the boss portion of the swash plate which is preset to a prescribed value, thus leading to the occurrence of an abnormal noise and a malfunction of the compressor.

OBJECTS AND SUMMARY OF THE INVENTION

It is an object of the invention to provide a swash-plate type compressor for use in an air conditioner for vehicles, which is provided with measures for preventing the rotation of the bearing ring on the cylinder block side of the thrust bearing supporting thrust loads applied by the swash plate, thus being free of abrasion in the associated face of the cylinder block as well as malfunction of the compressor.

According to the invention, there is provided an improved swash-plate type compressor which comprises: a pair of thrust bearings fitted on said drive shaft at opposite front and rear sides of the swash plate for supporting thrust loads applied by the swash plate, each interposed between a central boss portion of the swash plate and an associated central seat portion of corresponding one of cylinder blocks forming the outer frame of the compressor, said thrust bearing each including a bearing ring disposed in urging contact with the associated central seat portion of the corresponding cylinder block, said bearing ring having at least one engaging cut formed in a periphery thereof; and a pair of retainers each interposed between each of said bearing rings and the associated seat portion, said retainers each having one end face thereof formed with at least one first engaging protuberance for engagement with said engaging cut of said bearing ring, and the other end face formed with at least one second engaging protuberance for engagement with an associated end of corresponding one of spaces axially formed through the cylinder blocks.

Further and more specific objects, advantages and features of the present invention will become more apparent from the ensuing detailed description and the accompanying drawings.

DETAILED DESCRIPTION OF THE INVENTION

Figure 1:
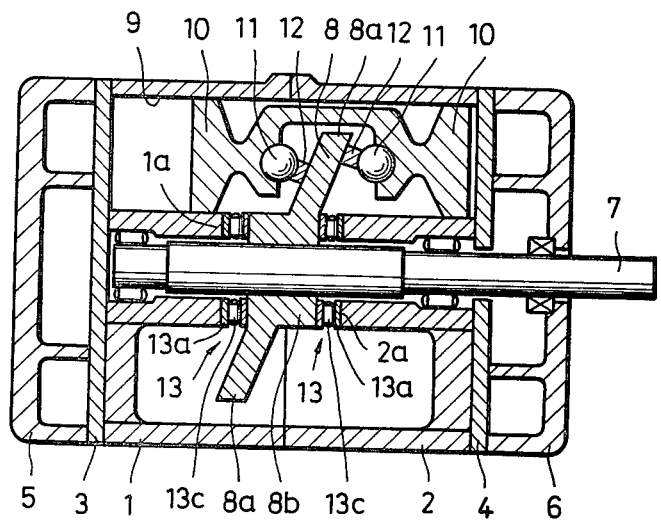
FIG. 1 is a schematic longitudinal sectional view of a conventional swash-plate type compressor.

Referring to FIG. 1, there is shown a conventional swash-plate type compressor used in general. A pair of cylinder blocks 1, 2 are joint together at ends thereof in an axial alignment. Two cylinder heads 5, 6 are joint to the other or outer ends of the cylinder blocks 1, 2 via valve plates 3, 4, respectively. A drive shaft 7 penetrates the cylinder head 6 and the cylinder blocks 1, 2 along axes thereof relative to the cylinder blocks 1, 2. A swash plate 8 is secured, at a central boss portion 8b thereof, to a portion of the drive shaft 7 which is inserted in the cylinder blocks 1, 2. A plurality of cylinder bores 9 extend through the cylinder blocks 1, 2 axially thereof, each of which receives a piston 10 for sliding therein. The piston 10 has a central recess which is engaged with an outer fringe 8a of said swash plate 8 via balls 11 and shoes 12. Thus, rotation of the swash plate 8 which takes place in unison with the rotation of the drive shaft 7 causes the pistons 10 to make reciprocating motions within the cylinder bores 9, to carry out pumping actions.

Two thrust bearings 13 are fitted on the drive shaft 7 at opposite front and rear sides of the boss portion 8b of the swash plate 8. Each of the thrust bearings 13 is interposed between said boss portion 8b and an associated central seat portion 1a or 2a of the cylinder block 1 or 2 for supporting thrust loads given by the swash plate 8.

However, when the swash plate 8 is rotated, the bearing ring 13a of the thrust bearing 13 held in contact with the cylinder block 1 or 2 is also rotated to slide on an associated face of the central seat portion 1a or 2a of the cylinder block, due to the rolling resistance of the needle rollers 13c of the thrust bearing 13. As a consequence, said associated face of the central seat portion of the cylinder block, which is made of a material having a low abrasion resistance such as aluminum, undergoes abrasion, so that the thrust or axial clearance between the seat portion of the cylinder block and the boss portion 8b of the swash plate 8 becomes larger than a prescribed value, causing an abnormal noise and a malfunction of the compressor.

Figure 2:
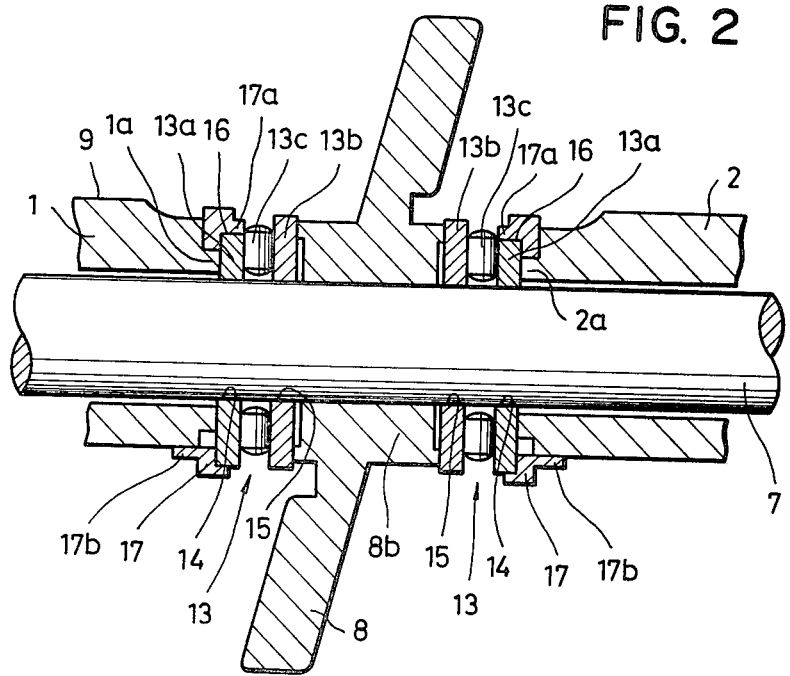
FIG. 2 is a fragmentary schematic longitudinal sectional view of an essential part of the swash-plate type compressor according to an embodiment of the present invention.
Figure 3:
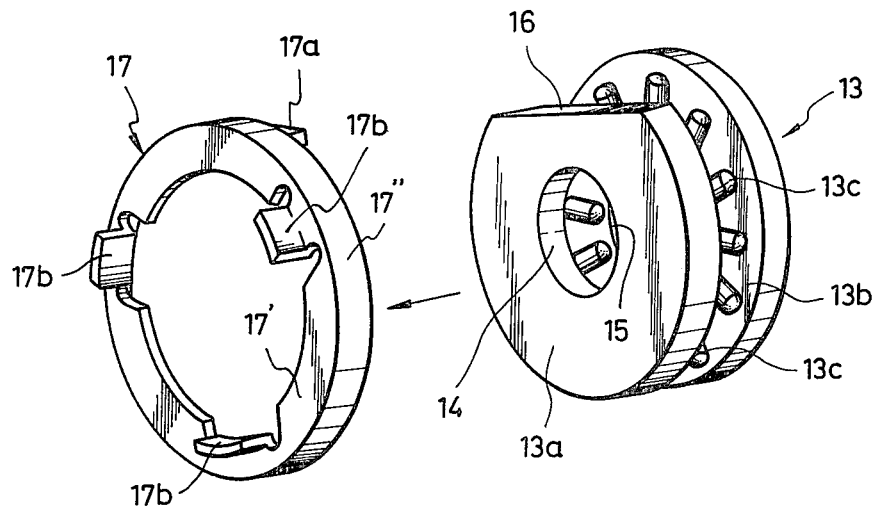
FIG. 3 is a schematic perspective view of a thrust bearing and a retainer employed in the compressor according to the invention.
Figure 4:
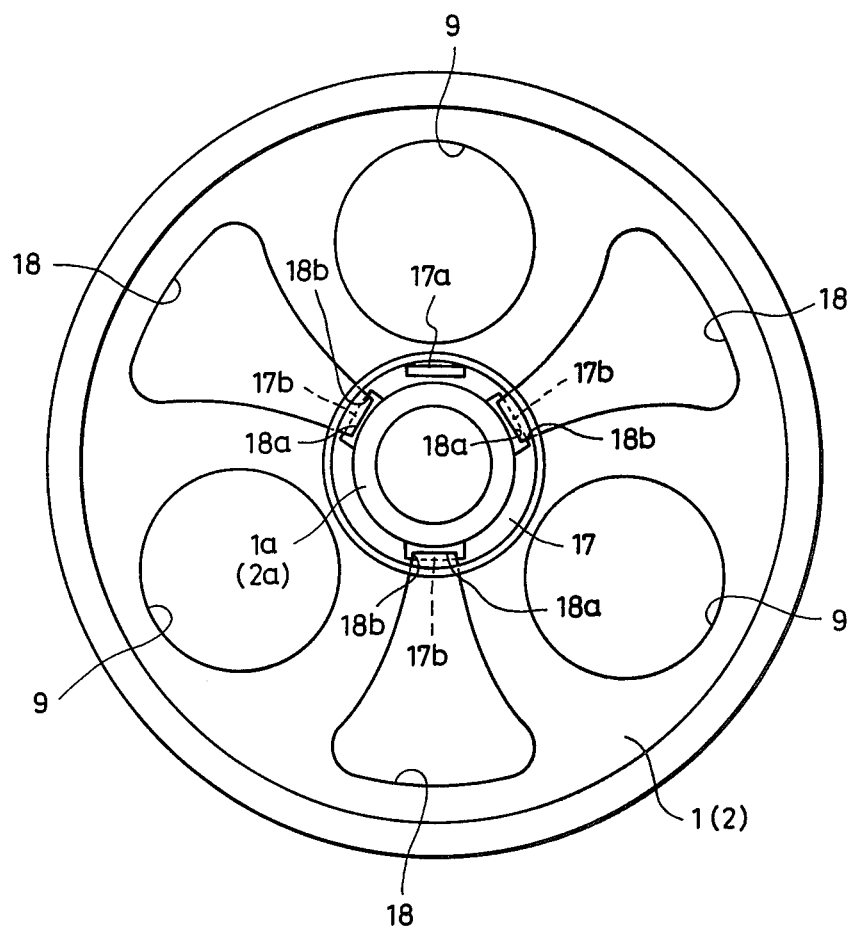
FIG. 4 is a front view of a cylinder block carrying a retainer, employed in the compressor according to the invention.

FIG. 2 through FIG. 4 illustrate an embodiment of the invention. The swash plate 8 has its boss portion 8b secured to the drive shaft 7 in a fashion being supported by thrust bearings 13 which are interposed between the boss portion 8b and the central seat portions 1a, 2a provided on the cylinder blocks 1, 2 at the front and rear sides of the swash plate 8, to support the swash plate 8 in axial directions in which thrusts act upon the swash plate 8.

Figure 5:
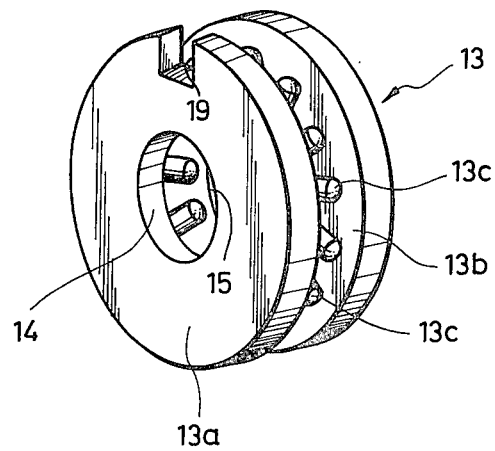
FIG. 5 is a schematic perspective view of another example of the thrust bearing employed in the compressor according to the invention.

The thrust bearing 13 is composed of two disk-like bearing ring 13a, 13b and a plurality of needle rollers 13c interposed between said bearing rings. These bearing rings 13a have central through bores 14, 15 receiving the drive shaft 7 therethrough. The inner bearing ring 13a has its outer end face held in urging contact with an associated end face of the boss portion 8b of the swash plate 8, while the outer bearing ring 13a has its outer end face held in contact with an associated end face of the seat portion 1a or 2a of the respective cylinder block 1 or 2 via a retainer, hereinafter referred to. The seat portions 1a, 2a of the cylinder blocks 1, 2 and the boss portion 8b of the swash plate 8 are forced to urge the outer rings 13a and the inner rings 13b against each other by means of fastening bolts, not illustrated, which axially penetrates the combined cylinder blocks 1, 2. Usually, the needle rollers 13c are held by cages which are not illustrated in the drawings. Part of the outer periphery of the outer bearing ring 13a on the cylinder block side is cut off to provide a planar cut surface 16. Although the bearing ring 13a is formed with the planar cut surface 16 in this embodiment, the scope of the invention is not limited to such planar cut surface, but an axial groove 19 of a U-shaped cross section may be formed in part of the outer periphery of the bearing ring 13a, as illustrated in FIG. 5.

The end faces of the central seat portions 1a, 2a of the cylinder blocks 1, 2 are engaged by retainers 17 which each have a substantially ring-like configuration, as illustrated in FIG. 3. The retainer 17 comprises an annular base portion 17' and a flange 17" axially extending from the outer periphery of the base portion 17'. The base portion 17' and the flange 17" engage the outer end face and the lateral peripheral surface of the outer bearing ring 13a of the thrust bearing 13, respectively. The retainer 17 has a plate-like engaging portion axially projecting from the flange 17" toward the thrust bearing 13 for engagement with the planar cut surface 16 of the outer bearing ring 13a. The retainer 17 also has a plurality of, three for instance, plate-like engaging portions 17b axially projecting from the innerperipheral edge of the base portion 17' and located at circumferentially equal intervals.

As shown in FIG. 4, three cylinder bores 9 are axially formed through the cylinder bores 1, 2 at circumferentially equal intervals. Formed respectively between the adjacent cylinder bores 9 are three spaces 18, each having a sectorial section, which axially extend in paralled with said cylinder bores 9 to serve as passages for refrigerant and a lubrication oil reservoir.

The retainers 17 are placed on the seat portions 1a, 2a of the respective cylinder blocks 1, 2 with the engaging protuberances 17b engaging the bottom or radially inner wall surfaces 18a and side wall surfaces 18b of end portions of the associated spaces 18.

Under the above-mentioned arrangement, when the swash plate 8 is rotated by the rotation of the drive shaft 7, the inner bearing ring 13b of the thrust bearing 13 on the swash plate side is also rotated. The rotative force of the bearing ring 13b is transmitted to the outer bearing ring 13a on the cylinder block 1 or 2 via the needle rollers 13c. However, said outer bearing ring 13a is kept from rotating, since this bearing ring 13a has its planar cut surface 16 held in engagement with the engaging protuberance 17a of the retainer 17, and at the same time the engaging protuberances 17b engage the spaces 18 of the cylinder block 1 or 2. Thus, there occurs no abrasion in the corresponding end faces of the bearing rings 13a and the seat portions 1a, 2a of the cylinder blocks 1, 2, so that the thrust or axial clearance between the seat portions 1a, 2a and the boss portion 8b of the swash plate 8 is maintained at a preset value.

The numbers of the planar cut surface 16, the groove 19 and the engaging protuberances 17a and 17b are not limited to those illustrated, but any desired numbers of these elements may be optionally provided, according to necessity. Particularly, if the planar cut surface 16 or the groove 19' and the engaging protuberance 17a are each formed in a plural number, a stronger engagement between the two members 13a and 17 can be obtained, thus enabling more effective prevention of the abrasion.

As set forth above, according to this invention, the compressor is so arranged that ratation of the bearing ring of the thrust bearing on the cylinder block side is prevented by means of the retainer. Thus, there occurs no substantial abrasion in the seat portion of the cylinder block which is in urging contact with said bearing ring, thereby maintaining the thrust of axial clearance between the central seat portion of the cylinder block and the boss portion of the swash plate at a prescribed proper value.

Furthermore, no machining of the cylinder blocks 1, 2 is required, but prevention of the abrasion in the surface of the seat portion can be achieved merely by providing the planar cut surface or the axial groove in the periphery of the bearing ring of the thrust bearing on the cylinder block side, and the engaging protuberances on the opposite side portions of the retainer facing, respectively, the thrust bearing and the cylinder block. The present invention is therefore applicable directly and immediately to an existing swash-plate type comressor as shown in FIG. 1, which has a conventional standard thrust clearance between the central seat portion of the cylinder block and the boss portion of the swash plate.

There will now be obvious to those skilled in the art many modifications and variations of the above-described structure. These modifications and variations will not depart from the scope of the invention if defined by the following claims.

What is claimed is:

1. In a swash-plate type compressor of the type having a pair of cylinder blocks combined together in an axial alignment, a drive shaft penetrating said combined cylinder blocks along axes thereof for rotation relative to said cylinder blocks, and a swash plate secured to said drive shaft, said combined cylinder blocks including a plurality of cylinder bores extending through the cylinder blocks axially thereof, each receiving a piston for sliding therein, and a plurality of spaces axially defined between adjacent cylinder bores, wherein said swash plate has an outer fringe thereof disposed in engagement with the piston thereby to rotate in unison with the drive shaft being rotated, for causing reciprocating motions of the piston with the cylinder bore to carry out a pumping action, the improvement comprising:

a pair of thrust bearings fitted on said drive shaft at opposite front and rear sides of said swash plate for supporting thrust loads applied by said swash plate, each thrust bearing being interposed between a central boss portion of said swash plate and an associated central seat portion of a corresponding one of said cylinder blocks, said thrust bearings each including a bearing ring disposed in urging contact with said associated central seat portion of the corresponding cylinder block, said bearing ring having as least one engaging cut formed in a periphery thereof; and a pair of annular retainers each interposed between said bearing ring and said associated central seat portion, said retainers each having one end face thereof formed with at least one first engaging axially directed protuberance for engagement with said engaging cut of said bearing ring, and the other end face of each retainer being formed with at least one second engaging axially directed protuberance for engagement with an associated end of a corresponding one of said spaces.

2. The swash-plate type compressor as recited in claim 1, in which said engaging cut of said bearing ring comprises a planar cut surface formed in a periphery of the bearing ring.

3. The swash-plate type compressor as recited in claim 1, in which said engaging cut of said bearing ring comprises an axial groove formed in a periphery of the bearing ring.

4. The swash-plate type compressor as recited in claim 1, in which said annular retainers each comprise: an annular base portion having an outer periphery; a flange axially extending from said outer periphery of said base portion; said at least one first engaging protuberance being plate-like and axially extending from said flange; and said at least one second protuberance being plate-like and axially extending from said base portion in a direction opposite to said at least one first engaging protuberance.

5. The swash-plate type compressor as recited in claim 1, in which said retainers are each formed with the same number of said second engaging protuberances as said spaces.

6. The swash-plate type compressor as recited in claim 1 comprising a plurality of said second engaging axially directed protuberances.

* * * * *